United States Patent
Yamane et al.

(10) Patent No.: US 7,484,810 B2
(45) Date of Patent: Feb. 3, 2009

(54) ARMREST APPARATUS

(75) Inventors: Takeshi Yamane, Okayama (JP); Tokuzo Kobayashi, Okayama (JP); Kadohisa Ishimura, Okayama (JP)

(73) Assignee: Bizen Hatsujoh Co., Ltd., Okayama (JP)

( * ) Notice: Subject to any disclaimer, the term of this patent is extended or adjusted under 35 U.S.C. 154(b) by 314 days.

(21) Appl. No.: 11/206,477

(22) Filed: Aug. 18, 2005

(65) Prior Publication Data

US 2006/0061189 A1  Mar. 23, 2006

(30) Foreign Application Priority Data

Aug. 18, 2004 (JP) .............................. 2004-238166
Jan. 14, 2005 (JP) .............................. 2005-007702

(51) Int. Cl.
*B60N 2/46* (2006.01)
*A47C 7/54* (2006.01)

(52) U.S. Cl. .............................. 297/411.32; 297/411.38

(58) Field of Classification Search .............. 297/411.3, 297/411.32, 411.38
See application file for complete search history.

(56) References Cited

U.S. PATENT DOCUMENTS 6,050,645 A * 4/2000 Bradbury ................ 297/411.38
6,916,068 B2 * 7/2005 Kitamura et al. ......... 297/411.3
7,198,331 B2 * 4/2007 Omori .................... 297/411.32

FOREIGN PATENT DOCUMENTS

| JP | 07-236547 | 9/1995 |
|---|---|---|
| JP | 2003-299547 | 10/2003 |
| JP | 2006-055258 | 3/2006 |
| WO | WO 2004/058008 | 7/2004 |

* cited by examiner

*Primary Examiner*—Joseph F Edell
(74) *Attorney, Agent, or Firm*—William L. Androlia; H. Henry Koda (57) ABSTRACT

A position adjustable armrest for a seat, including a drum fixed to the seat or the armrest, a casing fixed to the armrest or the seat and rotatable relative to the drum, a coil spring with one end thereof fixed to the casing and wound around the drum and the other end being in a free state, a cam that acts on the free end of the coil spring and displaces the free end in an axial direction and peripheral direction of the coil spring according to the relative angular displacement between the drum and the casing, and a spring guide that acts on the free end of the coil spring and allows the displacement in the peripheral direction of the coil spring to be maintained and returned according to the relative angular displacement.

3 Claims, 9 Drawing Sheets

ARMREST APPARATUS

BACKGROUND OF THE INVENTION

1. Field of the Invention

The present invention relates to an armrest apparatus for adjusting the angle of armrests used in automobiles, in welfare devices including, for instance, wheelchairs and in various fixed seats, so that the armrest is capable of making rotation from an initial horizontal position to a raised stowed position aligned with the seat back of the seat.

2. Description of the Related Art

An armrest must be restricted (locked) from rotating downward and allowed (unlocked) to rotate upward, and a coil spring is typically used for such a mechanism. Generally, if the coil spring is kept fastened to a certain extent to a drum and the other end is wound while left free, the coil spring remains tightened to the drum and cannot rotate by itself when the side at one end is turned in the direction that the coil spring tightens (diametrical reduction), and the coil spring rotates freely and smoothly over the drum when the side is turned in the direction that the coil spring loosens (diametrical expansion). Devices in which the angle of the armrest is adjusted by the coil spring utilize this property, and the resulting advantage is that the angle of the armrest can be adjusted in a stepless fashion.

However, this property is a hindrance when the armrest is returned to the initial position. At this time, it is necessary to prevent the coil spring from tightening; but in conventional structures, some kind of separate control member is provided, and the above-described property of the coil spring is counteracted by this control member when the armrest is returned to the initial position. This results in drawbacks in that both the armrest and the control member must be operated, and the operation becomes complex. In view of this, the inventors of the present applicant have proposed a mechanism in which the tightening and loosening of the coil spring is controlled by the armrest alone (see Japanese patent application No. 2004-238166).

However, in this prior art, the drum is fixed to the fixed member side (sheet); and this structure has problems. The width of the casing for fixing one end of the coil spring and housing the coil spring increases by a certain extent in order to ensure the number of turns of the coil spring, and the width of the armrest itself that is linked to the casing also increases accordingly. Therefore, installation is constrained in seat devices that do not have sufficient width.

BRIEF SUMMARY OF THE INVENTION

It has been discovered by the inventors of the present application that in the configuration for the drum, the coil spring, and the casing described above, the relationship in which the rotation is allowed in one direction and restricted in the other direction is the same whether the drum is fixed and the casing is rotated, or the casing is fixed and the drum is rotated; and in the present invention, the arm rest has an increased degree of freedom in design regardless of whether the drum or casing is fixed or rotated.

The above object is accomplished by a unique structure of the present invention for an armrest apparatus in which
the armrest is unable to rotate downward and is able to rotate upward within an adjustable angle range which is between an initial position of the armrest that is horizontal with respect to a seat and a position of the armrest raised by a specific angle;
when exceeding the limit of the adjustable angle range, the armrest is able to rotate upward to a stowed position and to rotate downward to the initial position; and
when the armrest returns to the initial position, a downward rotation thereof is disabled and an upward rotation thereof is enabled; and
in the present invention, the armrest apparatus includes:
a drum provided on the seat or the armrest,
a casing that is provided on the armrest or the seat and is rotatable relative to the drum,
a coil spring with one end thereof fixed to the casing and wound around the drum and another end thereof being in a free state,
a cam that acts on the free end of the coil spring and displaces the free end in an axial direction and peripheral direction of the coil spring according to the relative angular displacement between the drum and the casing, and
a spring guide that acts on the free end of the coil spring and allows the displacement in the peripheral direction of the coil spring to be maintained and returned according to the relative angular displacement between the drum and the casing.

In this structure,
when the armrest is within the adjustable angle range from the initial position,
the free end of the coil spring remains in the same cam-induced axial and peripheral displacement, and peripheral displacement of the free end of the coil spring is allowed by the spring guide so that the downward rotation of the armrest is disabled by the tendency of the coil spring to tighten and the upward rotation of the armrest is enabled by the tendency of the coil spring to loosen;
when the armrest exceeds the adjustable angle range,
the free end of the coil spring is displaced in the axial direction and the peripheral direction by the cam, and displacement of the free end of the coil spring in the peripheral direction is maintained by the spring guide, so that the coil spring is kept in a constant loosened state and the armrest is able to rotate upward and downward; and
when the armrest returns to the initial position,
displacement of the free end of the coil spring in the axial direction and the peripheral direction is eliminated by the cam, and displacement of the free end of the coil spring in the peripheral direction is allowed to be returned by the spring guide.

In the present invention, the drum is formed on an end surface thereof with the cam, the casing is formed on an end surface thereof with the spring guide, and the cam and spring guide are provided on opposite positions on either side of the coil spring. In addition, when the drum is provided on the seat, the armrest is mounted on the casing; and the armrest can be used as the casing, and the armrest can be formed by joining halved cap members together. The casing can be provided on the seat, so that the armrest is mounted on the drum. Furthermore, the casing can be formed with a flange, so that a part of the casing is embedded in the seat, and the flange is fixed by stitching it to the seat. The drum can be comprised of a first drum element and a second drum element which are of different diameter pipes and joined and fixed together by splining fitting. In addition, the armrest apparatus of the present invention can include a stopper projection, which is provided at a position on the cam that corresponds to the stowed position of the armrest so that it is interlocked with the free end of the coil spring.

As seen from the above, according to the present invention, the armrest apparatus has a structure that allows simple operation wherein the coil spring is restricted and released by the armrest alone, which is configured from a small number of members with simple structures including the drum, the casing, the coil spring, the cam, and the spring guide; and therefore it is inexpensive and lightweight with a small number of components. It has an increased degree of freedom in design because either the drum or the casing can be selected for the fixed side or the rotating side.

Furthermore, according to the present invention, the structure of the spring guide is simple, the cam and the spring guide are simplified and can be disposed in a compact manner, the armrest can be used as the casing to allow a reduction in components, the width of the armrest can be reduced and the amount by which the drum protrudes from the mounting surface of the casing is small to ensure an improvement in surface strength, assembly is easy by interlocking specific members with both pipes in a mounted state, and safety is no longer compromised by the armrest falling unexpectedly.

DETAILED DESCRIPTION OF THE INVENTION

The embodiments of the present invention will now be described with reference to the accompanying drawings.

Figure 11:
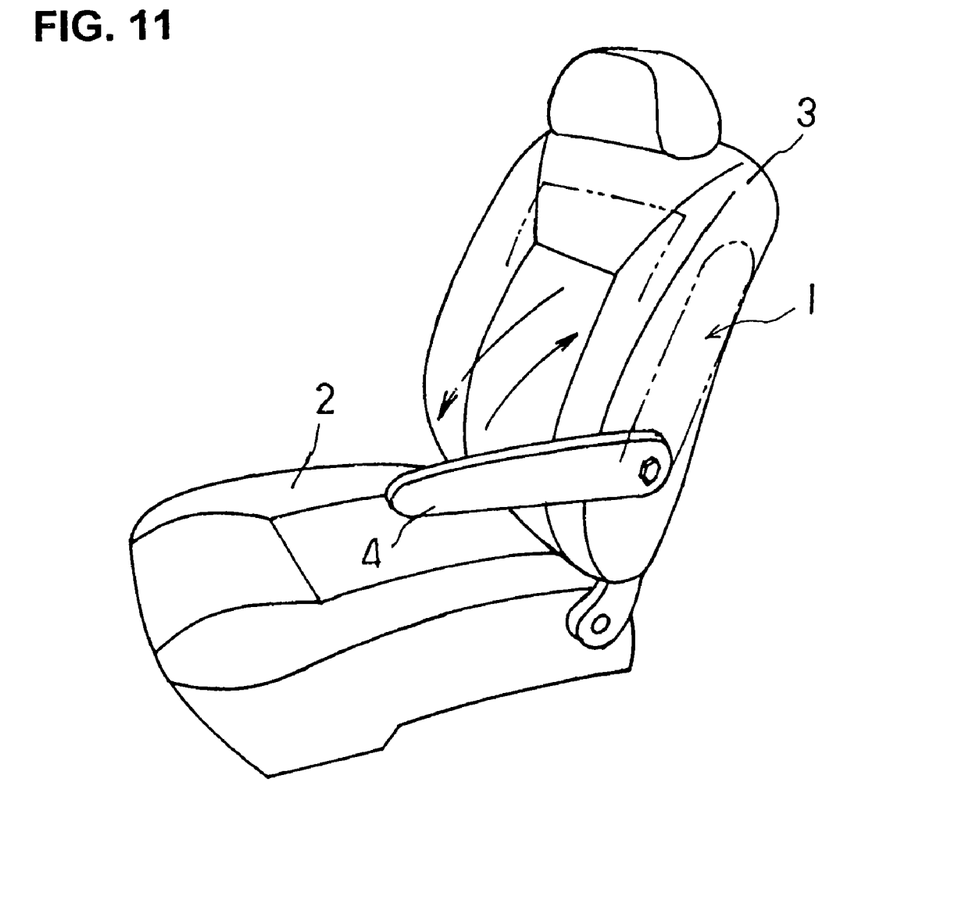
FIG. 11 is a perspective view showing a seat in an automobile.

As seen from FIG. 11, a seat 1 includes a seat back (or backrest) 3 that can be inclined with respect to the seat surface 2, and an armrest 4 is mounted on the side of the seat back 3. The armrest 4 is designed so that it can be set at an arbitrary angle raised by a certain angle within an armrest adjustable angle range from the initial position of projecting horizontally, with downward rotation being restricted. When the armrest exceeds the adjustable angle range, then it is either raised to the stowed position (shown by dotted line) that is aligned with the seat back 3 or rotated downward and returned to the initial horizontal position.

Figure 1:
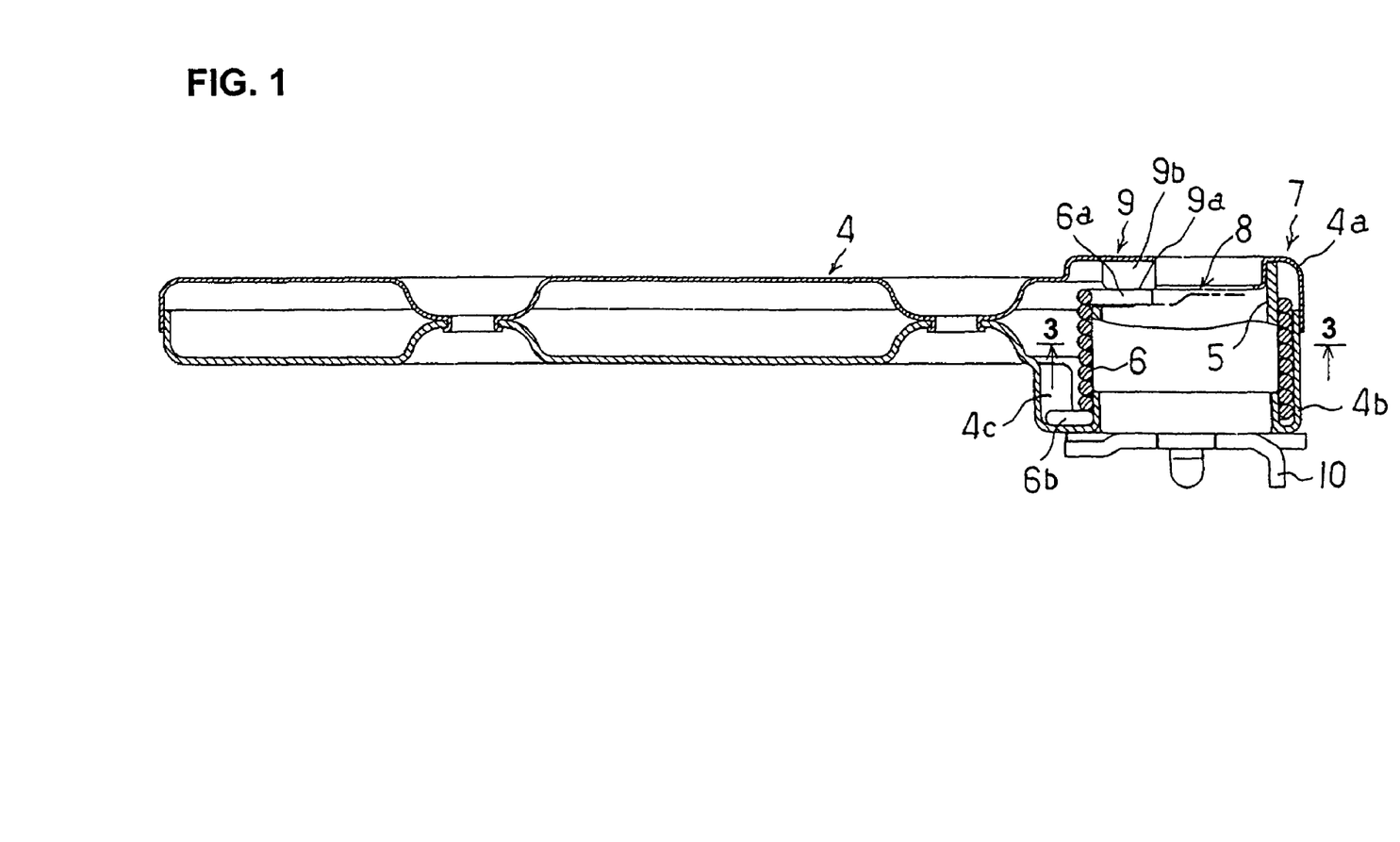
FIG. 1 is a cross-sectional top view of the armrest apparatus according to the embodiment of the present invention.
Figure 2:
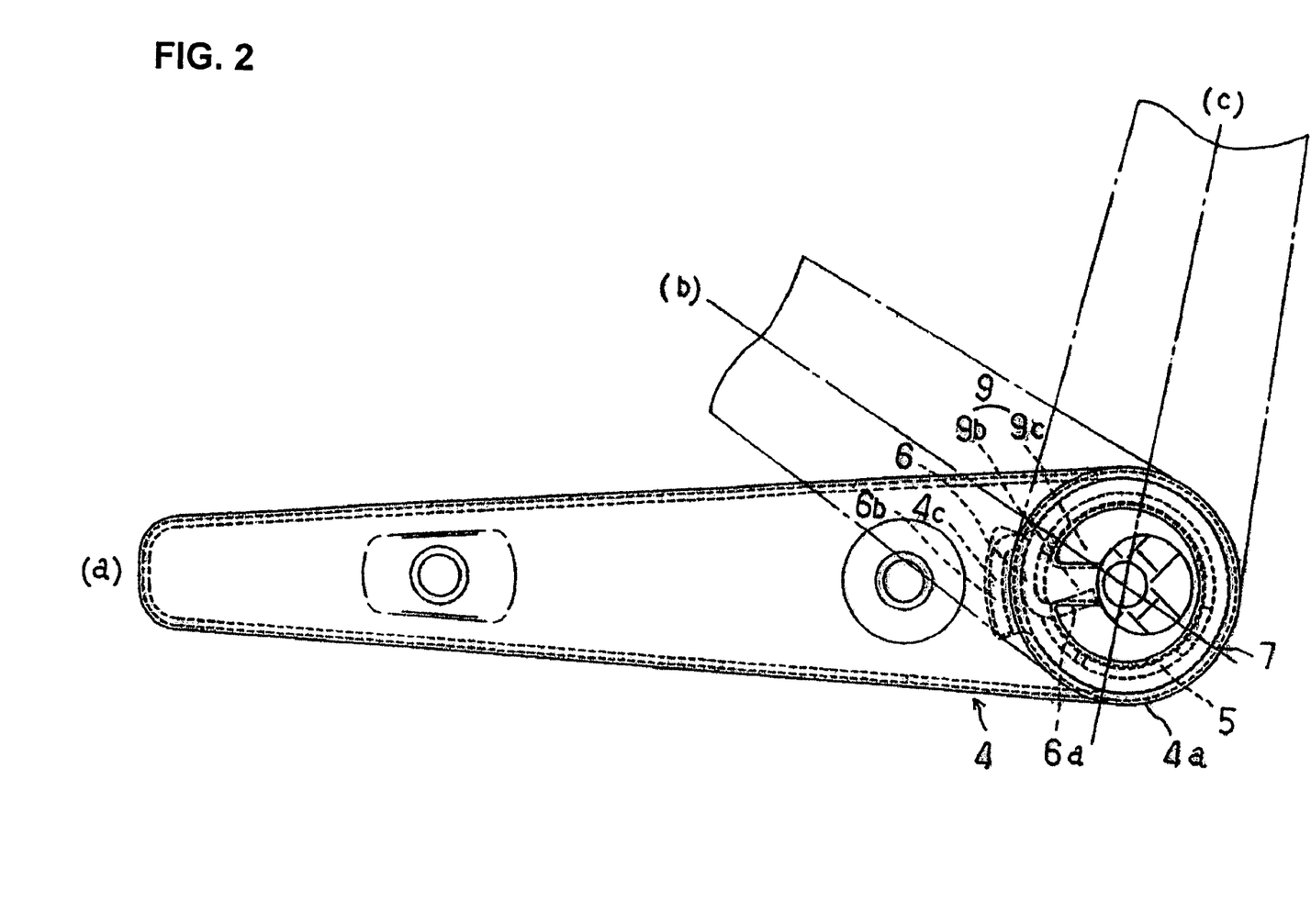
FIG. 2 is a rear view thereof.
Figure 3:
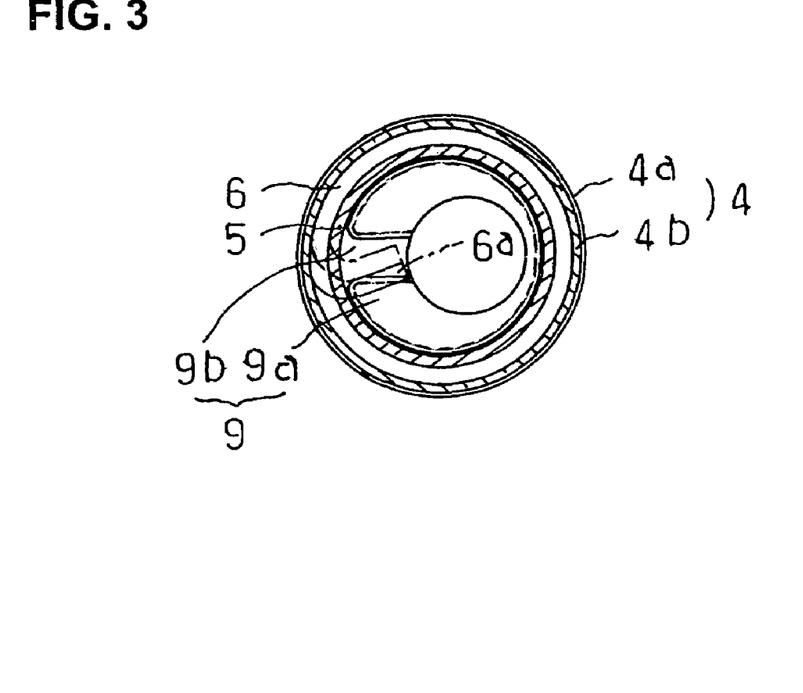
FIG. 3 is a cross-sectional view taken along the line 3-3 in FIG. 1.

As seen from FIGS. 1, 2 and 3, the armrest apparatus of the present invention is composed of a drum 5, a coil spring 6 wound around the outer periphery of the drum 5 with a second end (another end) as a free end 6a, a casing 7 to which a first end (one end) of the coil spring 6 is fixed and which is disposed to be capable of rotating concentrically with and relative to the outer periphery of the drum 5, a cam 8 that acts on the free end 6a of the coil spring 6 and displaces the free end 6a in the axial direction (longitudinal direction of the drum 5) and peripheral direction of the coil spring 6 according to the relative angular displacement between the drum 5 and the casing 7, and a spring guide 9 that likewise acts on the free end 6a of the coil spring 6 and allows the displacement of the free end 6a in the peripheral direction to be maintained and returned according to the relative angular displacement between the drum 5 and the casing 7.

The drum 5 has a cylindrical shape; and in the shown embodiment, the drum 5 is on the fixed side, or the drum 5 is a fixed element. In other words, the end of the drum 5 is secured by a mounting plate 10 fixed to the seat 1. The coil spring 6 is wound about 3-20 times around the outer periphery of the drum 5 with a coiling force that slightly reduces the spring diameter. One end (second end) of the coil spring 6 is fixed to the casing 7, and the other end (first end) is the free end 6a; but in the shown embodiment, the end is bent towards the inner periphery (the drum 5 is not included in this section), and this bent section is the free end 6a. Since the cam 8 or the spring guide 9 acts on the free end 6a, the radius of this scope of operation can be reduced to ensure compactness.

The casing 7 is linked to the armrest 4. In the shown embodiment, however, the number of components is reduced by using the casing 7 as the armrest 4. The armrest 4 in the shown embodiment has a structure in which the external member 4a and the internal member 4b that are both halved cap members are integrated by caulking, which ensures a simple and lightweight structure. A pocket 4c is formed in the internal member 4b of the armrest 4, which constitutes the fixed end 6b where one end of the coil spring 6 interlocks. The fixing of the coil spring 6 is not limited thereto and may be achieved by various other methods.

The cam 8 and the spring guide 9 act on the free end 6a of the coil spring 6 during the rotation of the coil spring 6 (casing 7) or the drum 5. Of these two members, the cam 8 acts on the free end 6a and displaces the free end 6a in the axial direction or peripheral direction of the coil spring 6 according to the relative angular displacement between the drum 5 and the casing 7. The cam 8 of the shown embodiment is formed directly in the end surface of the drum 5 to ensure a reduction in components. Accordingly, the spring guide 9 similarly acts on the free end 6a and allows the displacement of the coil spring 6 in the peripheral direction to be maintained and returned according to the same relative angular displacement. Also, the spring guide 9 of the shown embodiment is formed directly in the reverse side of the external member 4a of the armrest 4 to ensure a reduction in components.

Figure 4:
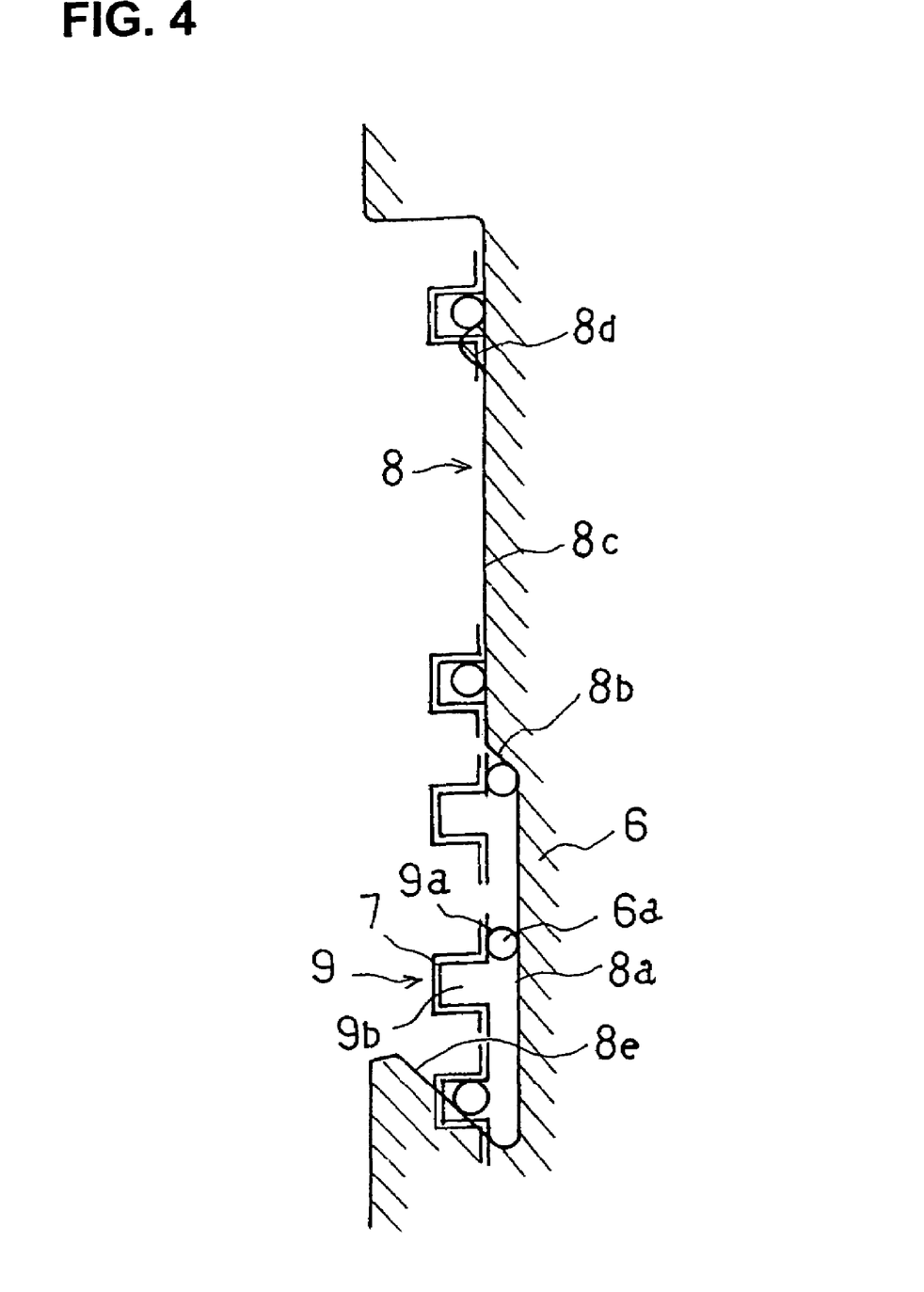
FIG. 4 is a development view of a drum showing the relationship between the cam and spring guide and the coil spring.

FIG. 4 is a development view of the drum 5 depicting the relationship between the shapes of the cam 8 and spring guide 9 described above; and formed in the cam 8 are: a first operating surface 8a parallel to the edge of the casing 7, that is, the armrest 4; a first inclined cam 8b that is connected to the first operating surface 8a and that gradually rises toward the outer side of the drum 5 in the upward rotating direction of the armrest 4; a second operating surface 8c that is connected to the first inclined cam 8b and is similarly parallel to the edge of the armrest 4; and a stopper projection 8d formed at a location on the second operating surface 8c corresponding to the stowed position of the armrest 4. Furthermore, the end of the first operating surface 8a in the downward rotating direction of the armrest 4 is formed into a second inclined cam 8e that gradually lowers in the downward rotating direction from a position higher than the second operating surface 8c.

The spring guide 9 guides the free end 6a of the coil spring 6 provided to the armrest 4 in the movement described above; and in the shown embodiment, the spring guide is comprised of a sliding surface 9a, which is on the reverse side of the external member 4a of the armrest 4 that allows the free end 6a to slide and does not restrain peripheral displacement, and a groove 9b, which accommodates the free end 6a of the coil spring 6 displaced in the axial direction or peripheral direction by the cam 8 when the casing 7 has rotated by a specific angle and that is depressed from the sliding surface 9a for maintaining the peripheral displacement by frictional resistance.

Next, the operation of the above-described armrest apparatus will be described.

When the casing 7, that is, the armrest 4, is in the substantially horizontal initial position (a), the free end 6a of the coil spring 6 slides on the sliding surface 9a of the spring guide 9. Therefore, when it is attempted to rotate the armrest 4 downward, the coil spring 6 tends to tighten around the drum 5, and the armrest 4 is unable to rotate; but when it is attempted to rotate the armrest upward, the coil spring tends to loosen, and the armrest 4 is rotated freely (because the free end 6a can slide over the sliding surface 9a).

The angle of the armrest 4 can thereby be adjusted, and the adjustment is accomplished in a smooth, stepless fashion. In this case, the sliding of the free end 6a on the first operating surface 8a does not need to be so strong as to create great resistance against the rotation of the armrest 4 (sliding may be eliminated in certain cases), and thus the wound wires of the coil spring 6 therefore do not press against each other, the wound wires slide smoothly against each other during tightening and loosening, the load performance and ease of operational are not affected, and the operational load is lightened.

The above operation is performed within an adjustable angle range set to about 30° from the horizontal position; but at this time, when the armrest is rotated upward to raise the set angle of the armrest 4, the upward movement is performed without changing the relationship between the free end 6a and the spring guide 9, and the armrest 4 is allowed to rotate upward but is restricted from rotating downward. The free end 6a of the coil spring 6 comes into contact with the first inclined cam 8b when the armrest 4 reaches the final point (b) of the adjustable angle range; and if the armrest 4 is then further rotated upward, the free end 6a is slightly displaced relatively backward in the peripheral direction by the resistance from the first inclined cam 8b; and when it reaches the position of the groove 9b, outward displacement in the axial direction is enabled and the free end 6a is raised up to the second operating surface 8c and simultaneously enters the groove 9b.

The backward displacement of the free end 6a in the peripheral direction at this time refers to the loosening of the coil spring 6 (a specific unwinding); and after this state is achieved, the tightening of the coil spring 6 in the peripheral direction by the recovery force, that is, the forward displacement of the free end 6a of the coil spring 6, is restricted by the front wall of the groove 9b, and the coil spring 6 is held in a constant tightened state. The free end 6a in this state attempts to return to its original position due to the recovery force of the coil spring 6 in the axial direction, but does not move in the axial direction because the frictional force resulting from the peripheral recovery force is set to be greater than the recovery force. Therefore, upward rotation and downward rotation are afterwards both enabled, and upward rotation to the stowed position (c) and downward rotation to the initial position (a) are enabled. At this time, the free end 6a of the coil spring 6 slides over the second operating surface 8c with a snapping force in the axial direction, and therefore the armrest 4 does not fall due to its own weight even in a range exceeding the adjustable angle range.

The state described above is maintained until the armrest 4 exceeds the adjustable angle range (b) and reaches the stowed position (c); and upon reaching the stowed position (c), the free end 6a of the coil spring 6 comes into contact with the stopper projection 8d, then moves over the protuberance to the tip thereof and is held in a lightly engaged state by the snapping force in the axial direction. Therefore, the armrest 4 does not unexpectedly rotate downward, and safety is maintained. When the armrest 4 is rotated downward, the free end 6a of the coil spring 6 moves past the first inclined cam 8b near the end of the adjustable angle range (b); but at this point, the free end 6a of the coil spring 6 is prevented from falling to the first operating surface 8a by the frictional resistance with the front wall of the groove 9b that results from the recovery force of the coil spring 6.

In view of this, when the armrest is rotated downward to the initial position (a) in this state, the free end 6a of the coil spring 6 then comes into contact with the second inclined cam 8e and falls to the first operating surface 8a, and this force causes the free end 6a to slide over the front wall of the groove 9b and to be forcefully returned to the top of the sliding surface 9a. At this point, the coil spring 6 returns to its regular wound state and moves in a specific fashion in which upward rotation is allowed and downward rotation is restricted.

As can be seen from the above, the armrest 4 does not necessarily need to stay at the stowed position (c) after exceeding the adjustable angle range (b), and it can also be rotated downward and returned to the initial position (a) and its regular state. The returning operation to the initial position (a) can therefore be considered to be quick and simple.

Figure 5:
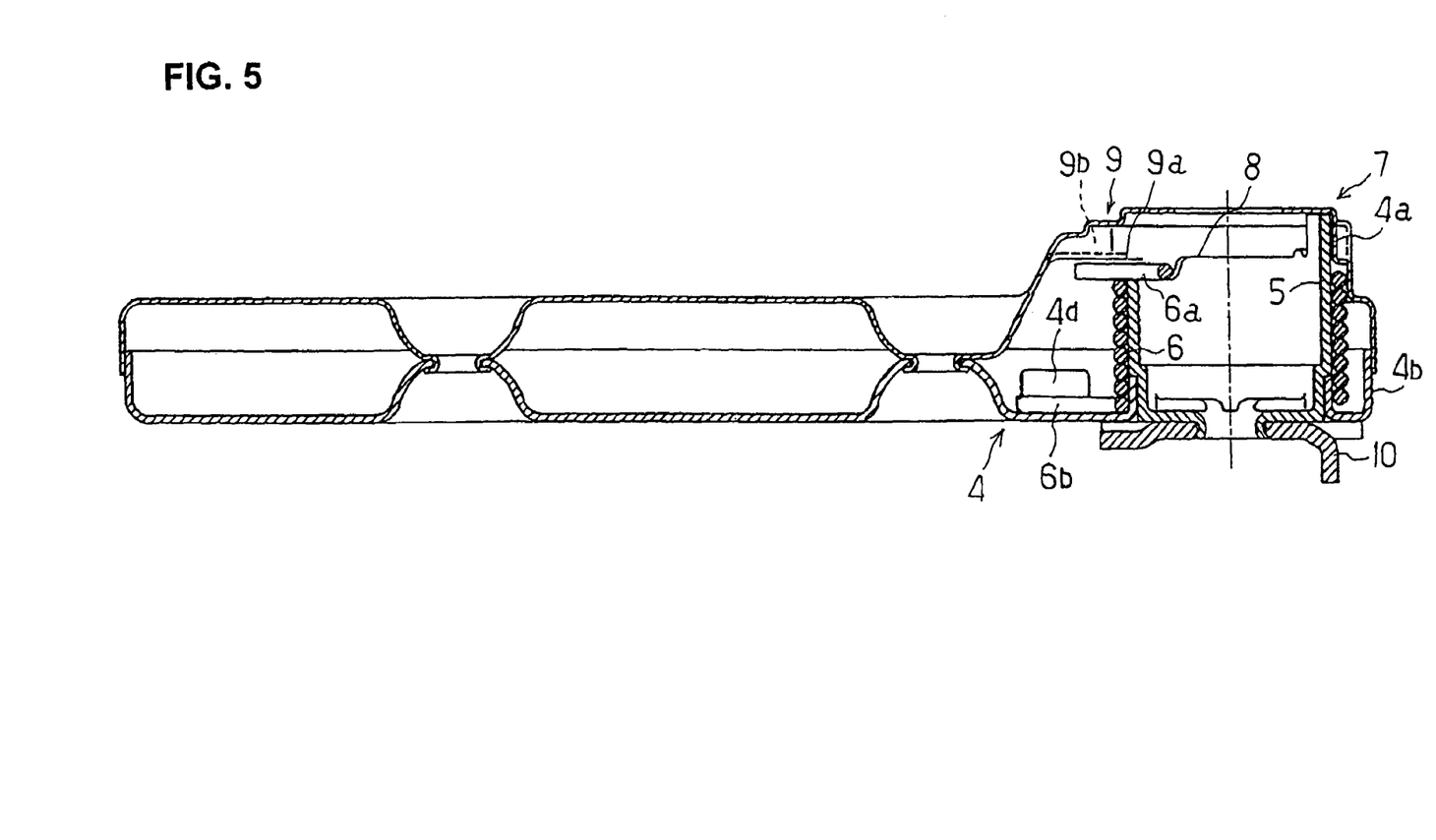
FIG. 5 is a cross-sectional top view of the armrest apparatus according to another embodiment of the present invention.
Figure 6:
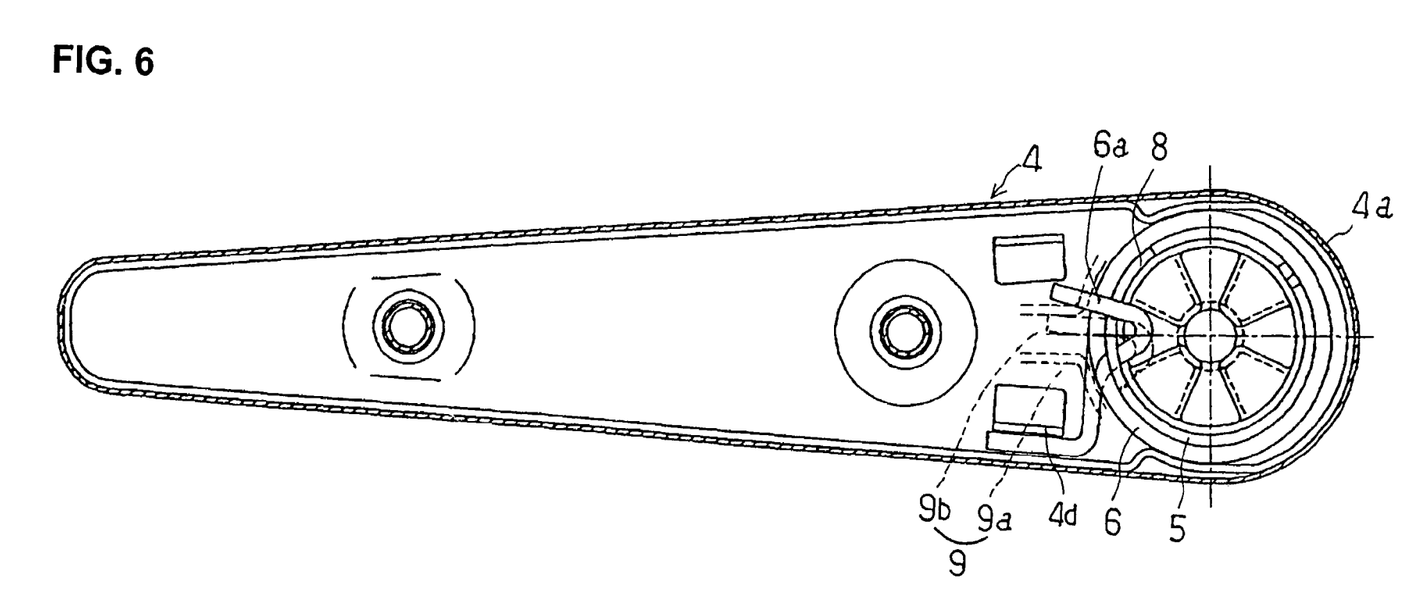
FIG. 6 is a rear view thereof.

FIG. 5 shows the armrest apparatus of another embodiment of the present invention, and FIG. 6 is a rear view. The armrest apparatus of FIGS. 5 and 6 is essentially no different from the embodiment previously described.

The differences are that an incision 4d is formed in the internal member 4b of the armrest 4, and the fixed side of the coil spring 6 is engaged and stopped by this incision 4d; in addition, the free end 6a of the coil spring 6 is bent into smaller diameter and then extended in the direction of larger diameter. The cam 8 acts on the smaller diameter section of the free end 6a of the coil spring 6, while the larger diameter section of the free end 6a of the coil spring 6 acts on the sliding surface 9a and the groove 9b of the spring guide 9. With this structure, the force acted on the free end 6a from the spring guide 9 can be reduced, and the precision of angle control for the spring guide 9 can be improved.

Figure 7:
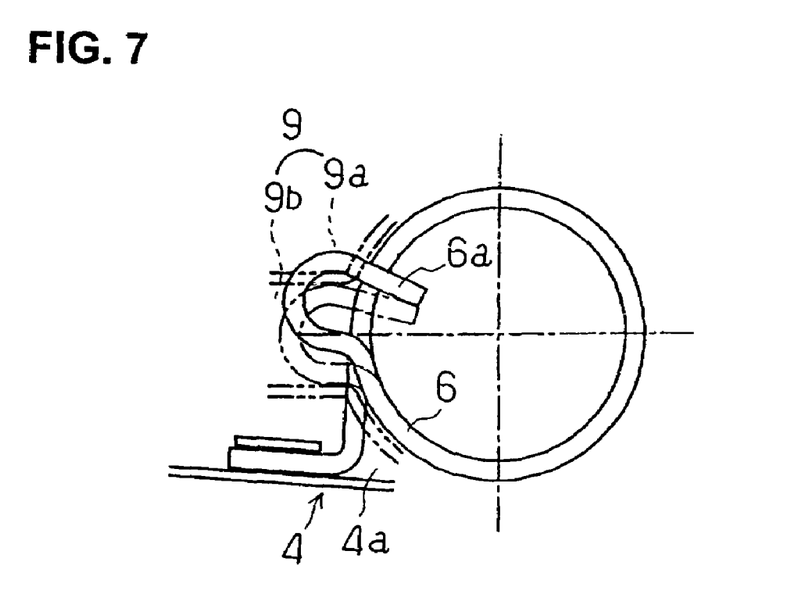
FIG. 7 is a partial rear view thereof.

FIG. 7 also shows another embodiment of the present invention. In the structure of FIG. 7, the free end 6a of the coil spring 6 is bent into larger diameter and then extended in the direction of smaller diameter, and two points in the larger section of the free end 6a of the coil spring 6 are engaged by the groove 9b of the spring guide 9. The interlocking of the free end 6a in the groove 9b is made more reliable as a result. In any case, a suitable structure should be selected according to the configuration of the cam 8 or the spring guide 9.

In all the embodiments described above, the drum 5 is fixed to the seat 1, and this structure has advantages in that only a simple mounting fixture (not shown) need be provided to the seat 1 side, and costs are reduced. Generally, fixing onto the seat 1 is relatively troublesome because the drum must be fixed to a framework provided in the deep section of the seat 1; but if a simple arrangement as described above is adopted, then mounting is easier. Seating devices in automobiles include those provided with an armrest 4 and those without an armrest; but with the configuration of the seat 1 side, it is presumed that the armrest 4 is provided. Therefore, the structure in which the drum 5 is fixed to the seat 1 has an advantage that not providing an armrest 4 would increase the costs slightly. Additionally, the casing 7 can also be used as the armrest 4, and it is possible to reduce the number of components and to reduce the weight.

Figure 8:
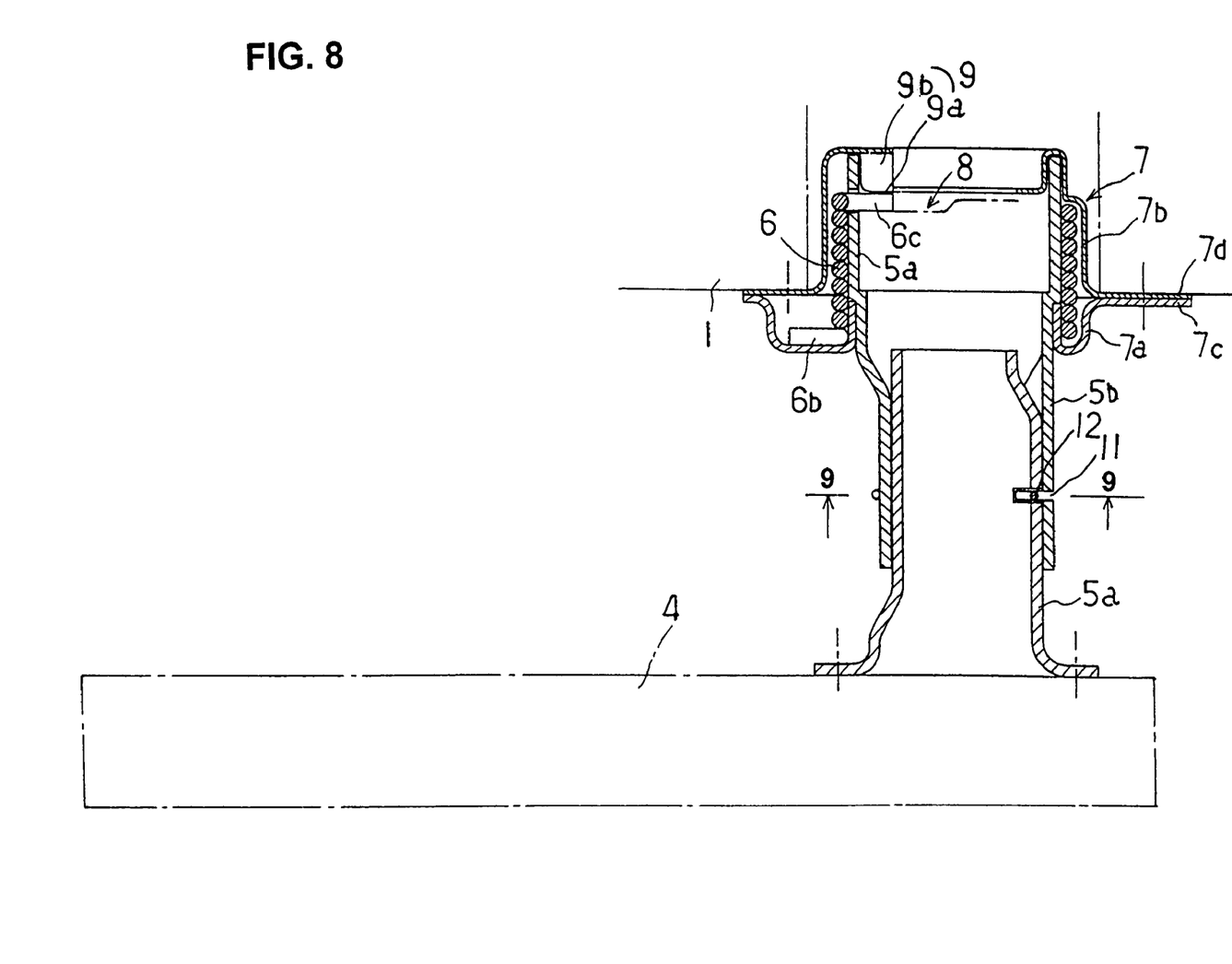
FIG. 8 is a cross-sectional top view of the armrest apparatus according to still another embodiment of the present invention.
Figure 9:
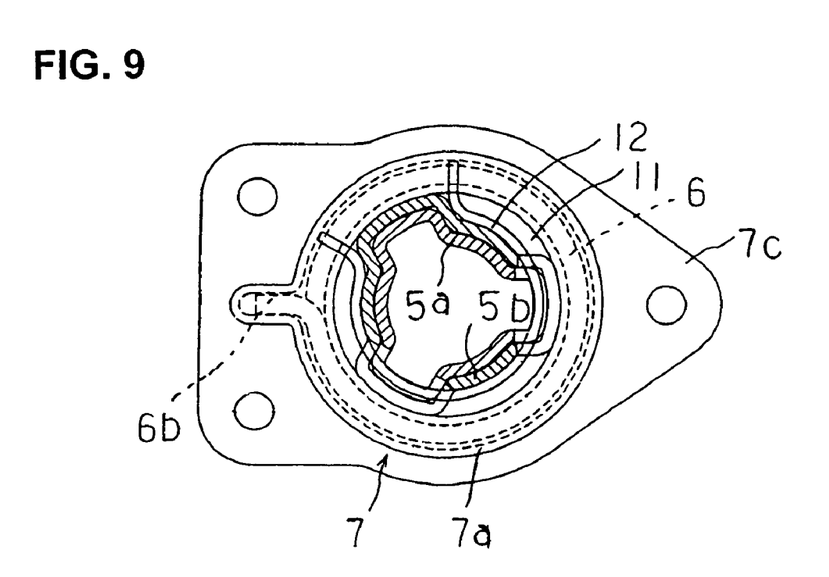
FIG. 9 is a cross-sectional view taken along the line 9-9 FIG. 8.
Figure 10:
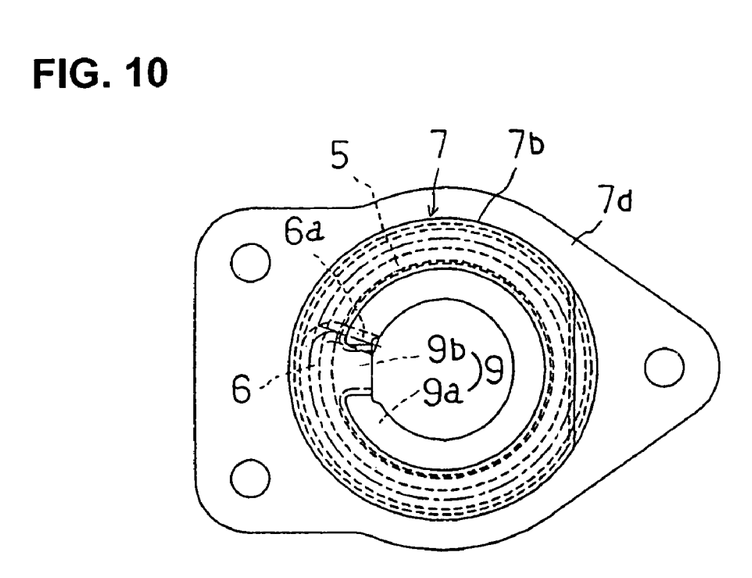
FIG. 10 is a partial rear view thereof.

FIGS. 8, 9 and 10 shows still another embodiment of the present invention.

In the structure of FIGS. 8, 9 and 10, the casing 7 is fixed to the seat 1 which is the fixed side element, and the armrest 4 is joined to the drum 5. In this structure, the drum 5, the coil spring 6, the casing 7, the cam 8, and the spring guide 9 have the same configurations and the same functions as the embodiments described above. In FIGS. 8, 9 and 10, the casing 7 is comprised of a cap-shaped external member 7a and an internal member 7b on which flanges 7c and 7d are formed respectively, and the flanges 7c and 7d are joined and are stitched into the framework of the seat 1.

Furthermore, the drum 5 is comprised of an outer first drum element 5a and an inner second drum element 5b, which are of different diameter hollow pipes; and they are splined (the first drum element 5a on the inner side and the second drum 5b on the outer side) and connected together so that rotation between these drum elements is not allowed. In this embodiment, the armrest 4 is joined to the first drum element 5a and is engaged by the second drum element 5b fastened on the seat 1. This arrangement has the advantage of easy assembly. During assembly, with a groove 11 formed in the part where the drum elements 5a and 5b are joined and with a clip-shaped wire spring 12 pressed into this groove, the wire spring 12 is located in the groove 11 and prevents the armrest 4 from pulling away.

In the above structure, a coil spring 6 or the like does not need to be incorporated into the armrest 4. Thus, it has the advantage that the width of the armrest 4 can be small. Also, the armrest 4 can have a simple structure, and joining thereof with the drum 5 is done simply. Furthermore, part of the casing 7 can be embedded in the seat 1, providing advantages in that there is less overhanging from the mounting surface of the casing 7 to the armrest 4, and the arrangement is efficient in terms of strength.

The invention claimed is:

1. An armrest apparatus wherein:
   an armrest is unable to rotate downward and is able to rotate upward within an adjustable angle range which is between an initial position of the armrest that is horizontal with respect to a seat and a position of the armrest raised by a specific angle;
   when exceeding the adjustable angle range, the armrest is able to rotate upward to a stowed position and to rotate downward to the initial position; and
   when the armrest returns to the initial position, a downward rotation thereof is disabled and an upward rotation thereof is enabled; and wherein said armrest apparatus comprises:
   a drum provided on the seat,
   a casing that is provided on the armrest so as to be rotatable relative to the drum,
   a coil spring with one end thereof fixed to the casing and wound around the drum and another end thereof being in a free state,
   a cam formed in an end surface of the drum, said cam acting on the free end of the coil spring and displacing the free end in an axial direction and peripheral direction of the coil spring according to a relative angular displacement between the drum and the casing, and
   a spring guide that acts on the free end of the coil spring and allows the displacement in the peripheral direction of the coil spring to be maintained and returned according to the relative angular displacement between the drum and the casing; and wherein
   when the armrest is within the adjustable angle range from the initial position, the free end of the coil spring remains in the same cam-induced axial and peripheral displacement, and peripheral displacement of the free end of the coil spring is allowed by the spring guide so that the downward rotation of the armrest is disabled by the tendency of the coil spring to tighten and the upward rotation of the armrest is enabled by the tendency of the coil spring to loosen;
   when the armrest exceeds the adjustable angle range, the free end of the coil spring is displaced in the axial direction and the peripheral direction by the cam, and displacement of the free end of the coil spring in the peripheral direction is maintained by the spring guide, so that the coil spring is kept in a constant loosened state and the armrest is able to rotate upward and downward; and
   when the arm rest returns to the initial position, displacement of the free end of the coil spring in the axial direction and the peripheral direction is eliminated by the cam, and displacement of the free end of the coil spring is in the peripheral direction is allowed to be returned by the spring guide.

2. The armrest apparatus according to claim 1, wherein the drum is comprised of a first drum element and a second drum element which are of different diameter pipes and joined together by splining fitting.

3. The armrest apparatus according to claim 1, further comprising a stopper projection which is interlocked with the free end of the coil spring, said stopper projection being provided at a position on the cam that corresponds to the stowed position of the armrest.

* * * * *